Patented Apr. 10, 1951

UNITED STATES PATENT OFFICE 2,547,944

2,547,944

CYCLIC POLYMERIC ORGANO SILICATES AND METHOD FOR PREPARING SAME

Ralph K. Iler, Cleveland Heights, Ohio, assignor to E. I. du Pont de Nemours & Company, Wilmington, Del., a corporation of Delaware No Drawing. Application December 19, 1945, Serial No. 636,051

8 Claims. (Cl. 260—448.8)

This invention relates to organo-silicon compounds and more particularly to processes for producing such compounds in which an organo-silicon halide having the formula $(A)_mSiX_{(4-m)}$, where A is selected from the group consisting of hydrocarbon and oxyhydrocarbon groups, $m$ is an integer from 1 to 3 inclusive, and X is a halogen atom selected from the group consisting of chlorine and fluorine, is hydrolyzed with water in the presence of at least 1 mol of tertiary amine per mol of halide group, and further relates to novel polymeric alkoxy siloxanes having the formula $[-(RO)_2SiO-]_z$ where $z$ is an integer greater than 4 and R is a hydrocarbon group, which compositions may be produced according to the processes.

It is an object of this invention to provide novel processes for producing organo-silicon compounds. Another object is to provide such processes in which organo-silicon halides are hydrolyzed with water. Another object is to provide such processes in which hydrogen halide, formed in the reaction mixture by the hydrolysis, is taken up by an acceptor therefor, whereby an increase in the concentration of free hydrogen halide proportional to the degree of hydrolysis is avoided. Another object is to provide novel organo-silicon compounds. Another object is to provide novel polymeric, alkoxy siloxanes having the formula $[-(RO)_2SiO-]_z$ where $z$ is an integer greater than 4 and R is a hydrocarbon group. Other objects will appear hereinafter.

The foregoing and other objects of this invention are accomplished by processes comprising hydrolyzing with water an organo-silicon halide having the formula $(A)_mSiX_{(4-m)}$, where A is selected from the group consisting of hydrocarbon and oxyhydrocarbon groups, $m$ is an integer from 1 to 3, inclusive, and X is a halogen atom selected from the group consisting of chlorine and fluorine, in the presence of at least one mol of a tertiary amine per mol of halide group, and are further accomplished by novel compositions comprising polymeric, alkoxy siloxanes having the formula $[-(RO)_2SiO-]_z$ where $z$ is an integer greater than 4 and R is a hydrocarbon group.

The organo-silicon halide which is hydrolyzed according to a process of this invention should respond broadly to the formula $(A)_mSiX_{(4-m)}$. A is selected from the group consisting of hydrocarbon and oxyhydrocarbon groups. The hydrocarbon group may be alkyl, such as methyl, ethyl or butyl; it may be aryl such as phenyl or naphthyl; it may be alkaryl such as tolyl or xylyl; or it may be aralkyl, such as benzyl. If A is an oxyhydrocarbon group it may be a hydrocarbon group such as just described attached to the silicon through an oxygen atom. Thus the group may be oxyalkyl such as methoxy, ethoxy, or butoxy, or it may be oxyaryl, such as phenoxy. The hydrocarbon group in each instance may be a higher member of the analogous series than the examples just mentioned.

In the organo-silicon halide, X may be chlorine or fluorine and $m$ is an integer from 1 to 3. Thus, when A is a methyl group and X is chlorine, if $m$ is 1 the organo-silicon halide will be methylsilicon trichloride. Similarly if $m$ is 2 the compound is dimethylsilicon dichloride and if $m$ is 3 the compound is trimethylsilicon monochloride. In similar manner, if A is a butoxy group, X is chlorine, and $m$ is 2 the compound will be dibutoxysilicon dichloride. It will be understood that mixtures of different organo-silicon halides may be used and that the values of $m$ for such mixtures may be fractional, but the individual constituents of such mixtures will respond to values for $m$ which are whole numbers.

The tertiary amine which is present when an organo-silicon halide is hydrolyzed with water according to a process of this invention may be any amine in which all three of the amine nitrogen valencies are satisfied by carbon atoms. Included are the simple amines in which a nitrogen is thrice substituted with the same carbon group, such as trimethyl amine, mixed amines which have different carbon groups attached to the nitrogen, such as ethyl dimethyl amine, and cyclic structures in which the amine nitrogen is attached to carbon atoms of a ring structure, such as pyridine. It is particularly preferred to use pyridine.

The proportion of tertiary amine employed should be at least one mol for each mol of halogen in the organo-silicon halide being hydrolyzed. In dimethyl silicon dichloride, for instance, there are two mols of chlorine and hence at least two mols of a tertiary amine such as pyridine should be present during the hydrolysis. In practice an excess of pyridine over the equi-molecular proportions is not objectionable and in some instances is advantageous.

The hydrolysis of an organo-silicon halide in the presence of a tertiary amine according to a process of this invention is effected by bringing the organo-silicon halide into contact with water. The reaction is exothermic and hence it is preferable to apply cooling to the reaction mixture. This can be done advantageously by adding the organo-silicon halide to water in the form of ice. The heat of reaction will melt the ice as required to supply additional water for further reaction and the melting of the ice will provide cooling.

The proportion of water employed in the hydrolysis may be varied depending upon the organo-silicon halide being hydrolyzed and the product it is desired to produce. When the organo-silicon halide is a hydrocarbon silicon halide, that is, when A in the formula given above is a hydrocarbon group, there is no danger of hydrolyzing off the hydrocarbon group and hence there is no particular reason to limit the proportion of water used except for convenience or where it is essential to carry out the reaction very slowly in order to control the polymerization.

When the organo-silicon halide being hydrolyzed is an oxyhydrocarbon silicon halide, such as an alkoxy silicon halide, and it it desired that none of the alkoxy groups be hydrolyzed off, the proportion of water employed in the hydrolysis preferably should be not more than the amount necessary to hydrolyze the halogen present, that is, to replace half of the halogen atoms on the silicon with hydroxyl groups. To hydrolyze off the 2 atoms of chlorine per molecule contained in dimethyl silicon dichloride, for instance, would require 1 mol of water and not substantially more than this amount of water should be employed. It will be understood that following the hydrolysis, water may split out between hydroxyl groups on different silicon atoms so that an Si—O—Si linkage is formed, and the water so split out is available for further hydrolysis or halide groups.

The minimum quantity of water to be employed is such as to hydrolyze exactly half of the halogen present, thus replacing half of the halogen atoms with hydroxyl groups. Further condensation and hydrolysis occur until finally all halogen and hydroxyls have been converted to siloxane linkages. Thus, to hydrolyze two atoms of chlorine, there is required only one mol of water, as a minimum. Obviously, this one mol can at first hydrolyze only one atom of chlorine, but the hydroxyl group which is formed can either further condense, splitting out water, or it can perhaps interact directly with a chlorine, splitting out HCl and forming the siloxane linkage.

However, where it is desired to remove some but not all of the oxyhydrocarbon groups, an excess of water may be used for hydrolysis in the presence of tertiary amine. In this case it has been found that when one starts with $(RO)_2SiCl_2$, hydrolysis of the oxyhydrocarbon groups continues to the point where there remains on the average only slightly more than one (RO) group per silicon in the product. Where one starts with $(RO)_3SiCl$ there is rapid hydrolysis, and condensation to the dimer $(RO)_3SiOSi(RO)_3$ occurs and there is no further hydrolysis. It is, therefore, apparent that in the presence of excess water and tertiary amine, hydrolysis of materials containing 2 or 3 oxyhydrocarbon groups per silicon atom proceeds until there remains either three or one oxyhydrocarbon group per silicon.

To secure homogeneity of the reaction mixture and insure uniformity of products obtained, it is advantageous to provide agitation, and especially high speed agitation, during the hydrolysis step.

The halogen which is hydrolyzed off the organo-silicon halide forms the corresponding hydrogen halide which in turn forms a hydrochloride of the tertiary amine present.

The tertiary amine hydrochloride may be separated from the other products of the reaction by any suitable means such as by distilling it off from the silicon-containing product under vacuum. It is especially preferred, however, to effect the separation by having present an organic solvent which is immiscible with water, inert to hydrogen halide, and a solvent for the organo-silicon products formed by the reaction. By having present such a solvent two immiscible liquid phases occur after the reaction, one containing the organo-silicon product and the other the tertiary amine hydrochloride and any free water. The two liquid phases may then be separated gravitationally and the organo-silicon product may be recovered by distilling off the organic solvent, preferably under vacuum.

Among the organic solvents which are immiscible with water, are chemically inert to hydrogen halide, and are solvents for the organo-silicon product are hydrocarbons, such as isobutane, normal pentane, and cyclohexane, and ethers such as dimethyl ether, diethyl ether, and dibutyl ether. The volume of the organic solvent to use should be at least equal to the volume of organo-silicon halide hydrolyzed and preferably is about from 10 to 20 times the volume of organo-silicon halide.

The organic solvent may be added after the reaction to extract the hydrolyzed organo-silicon product or it may be added with the organo-silicon halide. The latter practice is preferred because it provides an effective means for moderating the reaction, and is essential in the particular case where oxyhydrocarbon silicon halides are hydrolyzed with more than a stoichiometric quantity of water.

The processes of the present invention may be used to particular advantage where the organo-silicon halide hydrolyzed is a di-alkoxy silicon halide, in which the alkoxy group contains at least 4 carbon atoms; that is, when in the formula $(A)_m SiX_{(4-m)}$ A is an alkoxy group such as a butoxy group and $m$ is 2. Hitherto, efforts to hydrolyze organo-silicon halides have resulted not only in the hydrolysis of the halide group but also in hydrolysis of the alkoxy group. The present novel processes produce novel compositions having the formula $[—(RO)_2SiO—]_z$ where $z$ is an integer at least 3 and R is a hydrocarbon group containing at least 4 carbon atoms. It will be understood of course that following the hydrolysis a polymerization of the product occurs spontaneously, but under the conditions of the present novel processes this polymerization is not occasioned by hydrolysis of the alkoxy group and the product consequently is characterized by retaining the original two alkoxy groups per silicon atom.

The novel compositions of this invention having the formula $[—(RO)_2SiO—]_z$ are characterized by unusual properties. For example, where R represents the butyl group, the product is a thermostable oil which boils under vacuum without decomposition up to 450° C. and does not solidify at —50° C., indicating its use as a heat transfer fluid, as a hydraulic fluid, and as a lubricant.

The nature of the invention and its manner of application will be better understood by reference to the following illustrative examples.

*Example I*

As an example of the hydrolysis and condensation of dibutoxy silicon dichloride to form cyclic butoxy siloxane, 0.2 gram-mol of $(BuO)_2SiCl_2$ dissolved in 600 cc. of dry ether was placed in a reaction vessel fitted with a reflux condenser and stirrer, and there was added thereto, with good agitation, 0.2 gram-mol of water dissolved in 0.4 gram-mol of pyridine. The mixture was refluxed for 24 hours, filtered to remove the precipitated pyridine hydrochloride, the ether removed by distillation at atmospheric pressure and the product fractionally distilled at a pressure of 3 mm. of Hg. There were obtained approximately 33 grams of oils distilling between 200 and 345° C. at this pressure. Careful fractionation of the product permitted the separation of four pure compounds and another mixture of two more compounds, having the following characteristics. These products are cyclic siloxanes of the general formula $[(BuO)_2SiO]_n$ wherein $n$ is an integer ranging from 3 to 8 inclusively.

|  | B. Point at 3 mm. (Mercury) | Refractive Index (20° C.) |
| --- | --- | --- |
|  | ° C. |  |
| Cyclic Trimer | 185–190 | 1.4196 |
| Cyclic Tetramer | 220–225 | 1.4220 |
| Cyclic Pentamer | 245–250 | 1.4228 |
| Cyclic Hexamer | 275–280 | 1.4230 |
| Cyclic Heptamer and Octomer | 300–326 | 1.4240 |

These materials were identified by chemical analysis for carbon, hydrogen, and silicon, whence it was found that they contained very close to two butoxy groups per silicon atom; the number of silicon atoms per molecule was calculated from molecular weight measurements to permit identification as trimer, tetramer, etc.

It will be noted that in this example there has been practically no hydrolysis of the butoxy groups since the product oils contain the same ratio of butoxy groups per silicon atom as the starting material. Removal of the chloride from silicon was completed as indicated by the fact that these butoxy-silicone oils were essentially free from chlorine.

The fact that pyridine or other tertiary amines is necessary in order to achieve these results was demonstrated in a second experiment in which pyridine was omitted. There was complete disproportionation of the dibutoxy silicon dichloride, resulting in the formation of an appreciable quantity of butyl orthosilicate and a non-volatile polymer containing approximately one butoxy group per silicon atom. It is probable that in the reaction of dibutoxy silicon dichloride with a theoretical quantity of water in the absence of a tertiary amine, there is considerable hydrolysis of butoxy groups to butyl alcohol, which then reacts with dibutoxy silicon dichloride to give butyl orthosilicate, and a polymer containing a much lower ratio of butoxy groups than the original starting material.

*Example II*

As an example of the use of a tertiary amine to modify the hydrolysis of dibutoxy silicon dichloride in the presence of an excess of water, the following example is cited:

One hundred cc. of pyridine were added to 400 grams of crushed ice and stirred until the mixture was sufficiently fluid to permit agitation with a propeller-type stirrer. Separately there was prepared a solution of 0.2 gram-mol of dibutoxy silicon dichloride in 400 cc. of benzene. This benzene solution of the silicon compound was then added over a period of five minutes to the rapidly stirred pyridine-ice water mixture. After 15 minutes the ice had all melted and the mixture spontaneously separated into an upper benzene layer and a lower aqueous phase. The upper benzene layer was removed to a distilling apparatus, the benzene was recovered by distillation at atmospheric pressure and the residual viscous silicone polymer heated up to a temperature of 360° C. under a vacuum of 3 mm. to remove all traces of volatile material. No distillable silicon compounds were obtained. There remained in the still 18.3 grams of a very viscous residue which was solid and resinous at ordinary temperature, soluble in benzene and chloroform. Upon analysis it was found to contain 1.03 butoxy groups per silicon atom and had a molecular weight of about 4900 as determined by the freezing point method in benzene.

A similar experiment carried out without the use of pyridine yielded no resinous residue of this type. Most of the silica was found to be precipitated in the reaction mixture.

*Example III*

By the method of this invention it is also possible to combine monobutoxy and dibutoxysilicon derivatives in such a way as to obtain polymeric products containing any desired ratio of butoxy groups to silicon atoms. For example, by the hydrolysis of chloride from a mixture of monobutoxy silicon trichloride and butoxysilicon dichloride and simultaneous condensation of the hydrolysis products so obtained, it is possible to produce silicone polymers containing between one and two butoxy groups per silicon atom. For example, 0.101 gram-mols of $(BuO)SiCl_3$ and 0.44 gram-mols of $(BuO)_2SiCl_2$ were dissolved in 200 cc. of dry ether; to this solution, with good agitation, was then added a separately prepared solution of 0.198 gram-mols of water and 0.395 gram-mols of pyridine dissolved in 200 cc. of dry ether. After the reagents were mixed the mixture was refluxed 24 hours. The pyridine hydrochloride was then removed by filtration, the ether removed from the filtrate by distillation, and the residual product heated under a vacuum of 3 mm. Hg to 400° C. to remove volatile oils. There remained in the still 14 grams of a viscous syrupy silicon polymer containing 1.13 butoxy groups per silicon and having a molecular weight corresponding to about 13 silicon atoms per molecule.

*Example IV*

A solution of 0.3 gram-mols of $BuSiCl_3$ in 300 cc. of dry ether and 40 cc. of pyridine were added with rapid agitation to about 400 cc. of ice water and stirred for five minutes. The ether layer was then collected, the ether removed by distillation, and the residue heated under vacuum at 2 mm. pressure of Hg. At 200–250° C. there distilled 8.5 grams of an oil leaving a residue of 21.0 grams of a rubbery gel which was the monobutyl silicone polymer.

*Example V*

As an example of the advantages obtained by the use of a tertiary amine in the hydrolysis of alkyl silicon chlorides, the following experiment indicates that the properties of the resulting butyl silicon are improved by the use of pyridine as a modifying agent.

There were dissolved in 50 cc. of dry ether, 0.05 gram-mols of $BuSiCl_3$ and 0.12 gram-mols of $Bu_2SiCl_2$. Sixteen (16) cc. of pyridine were then added and the mixture poured onto ice, with stirring. After the ice had melted, the ether layer was recovered and the ether evaporated, leaving a clear viscous oil which, when spread on glass and heated for 30 minutes at 200° C., formed a clear, slightly tacky resinous film.

A similar experiment omitting pyridine yielded a product which, though initially similar in appearance, yielded a crazed, poorly adherent film on glass after baking for 30 minutes at 200° C.

Example VI

Tertiary amines have a marked influence on the type of polymer obtained by the hydrolysis and condensation of dialkylsilicon dichlorides. They appear to promote formation of a polymer of higher molecular weight than can be obtained by the hydrolysis of dialkylsilicon chlorides in the presence of water alone.

In a 100 cc. flask with constant stirring, 43.9 grams of dimethylsilicon dichloride were cooled in a dry ice acetone bath and then a pyridine-water mixture made up from 59.4 grams of pyridine and 6.76 grams of water was added slowly drop-wise. When one-third of the pyridine-water mixture had been added, a vigorous reaction occurred and then the contents of the flask solidified to a hard cake. The cooling bath was removed and the reaction mixture allowed to be warmed to room temperature. The remainder of the pyridine-water mixture was then added over a period of 90 minutes and the mixture further stirred for 90 minutes. The contents of the flask was removed with 300 cc. ether and the ether solution was stirred with 300 cc. of water to dissolve the pyridine hydrochloride. The ether extract was then further washed three times with additional 500 cc. portions of water and the ether layer was then distilled to remove the ether. The residual oil was then further distilled, first at atmospheric pressure and later under vacuum, until the residue in the flask had reached a temperature of 300° C. under an absolute pressure of 1 mm. of mercury. During this distillation some volatile products were removed, including pyridine and ether. The residue in the flask, which weighed 12.9 grams and which appeared to be free from pyridine, was a soft, tacky, rubbery material which is believed to be a linear dimethyl-silicon polymer of high molecular weight.

That the tertiary amine, pyridine, had been instrumental in causing the formation of a high polymer, is demonstrated by the fact that a similar experiment in which 38.4 grams of dimethylsilicon dichloride were treated with 5.4 grams of ice in much the same manner as above, yielded only silicone oils and no rubbery polymer.

I claim:

1. In a process for producing organo-silicon compounds the step comprising hydrolyzing with water at about the temperature of ice melting in the reaction mixture an organo-silicon halide having the formula $(A)_mSiX_{(4-m)}$ where A is selected from the group consisting of hydrocarbon and oxyhydrocarbon groups containing up to 10 carbon atoms, $m$ is an integer from 1 to 3 inclusive, and X is a halogen atom selected from the group consisting of chlorine and fluorine, in the presence of at least one mol of tertiary amine per mol of halide group, the amount of water being not less than one-half mol for each mol of halogen originally present in the organosilicon halide.

2. In a process for producing organo-silicon compounds the step comprising hydrolyzing with water at about the temperature of ice melting in the reaction mixture an organo-silicon halide having the formula $(A)_mSiX_{(4-m)}$ where A is selected from the group consisting of hydrocarbon and oxyhydrocarbon groups containing up to 10 carbon atoms, $m$ is an integer from 1 to 3 inclusive, and X is a halogen atom selected from the group consisting of chlorine and fluorine, in the presence of at least one mol of pyridine per mol of halide group, the amount of water being not less than one-half mol for each mol of halogen originally present in the organosilicon halide.

3. In a process for producing organo-silicon compounds the step comprising hydrolyzing with water at about the temperature of ice melting in the reaction mixture an alkoxy silicon chloride in which the alkoxy and chloride radicals attached to a single silicon atom total 4 in the presence of at least one mol of tertiary amine per mol of chloride radical present in the alkoxy silicon chloride, the amount of water being not less than one-half mol for each mol of chloride radical originally present in the alkoxy silicon chloride.

4. In a process for producing organo-silicon compounds the step comprising hydrolyzing with water at about the temperature of ice melting in the reaction mixture an alkoxy silicon chloride in which the alkoxy and chloride radicals attached to a single silicon atom total 4 in the presence of at least one mol of pyridine per mol of chloride radical present in the alkoxy silicon chloride, the amount of water being not less than one-half mol for each mol of chloride radical originally present in the alkoxy silicon chloride.

5. In a process for producing organo-silicon compounds the step comprising hydrolyzing with water at about the temperature of ice melting in the reaction mixture a di-alkoxy silicon dichloride in the presence of at least one mol of pyridine per mol of chloride radical present in the dialkoxy silicon dichloride, the amount of water being not less than one-half mol for each mol of chloride radical originally present in the alkoxy silicon chloride.

6. A cyclic polymeric organo-silicon compound having the formula $[-(RO)_2SiO-]_z$ where $z$ is an integer from 4 to 8 and R is a hydrocarbon group containing up to 10 carbon atoms, said composition being characterized by being a thermostable oil.

7. A cyclic polymeric organo-silicon compound having the formula $[-(RO)_2SiO-]_z$ where $z$ is an integer from 4 to 8 and R is an alkyl group containing from 1 to 4 carbon atoms, said composition being characterized by being a thermostable oil.

8. A cyclic polymeric organo-silicon compound having the formula $[-(RO)_2SiO-]_z$ where $z$ is an integer from 4 to 8 and R is a butyl group, said composition being characterized by being a thermostable oil.

RALPH K. ILER.

REFERENCES CITED

The following references are of record in the file of this patent:

UNITED STATES PATENTS

| Number | Name | Date |
|---|---|---|
| 1,450,467 | Weyland | Apr. 3, 1923 |
| 2,114,866 | Vaughn | Apr. 18, 1938 |
| 2,212,992 | Sowa | Aug. 27, 1940 |
| 2,265,962 | Bent et al. | Dec. 9, 1941 |
| 2,306,222 | Patnode | Dec. 22, 1942 |
| 2,317,891 | Dennison | Apr. 27, 1943 |
| 2,329,632 | Marsden | Sept. 14, 1943 |
| 2,381,366 | Patnode | Aug. 7, 1945 |
| 2,389,807 | McGregor et al. | Nov. 27, 1945 |
| 2,398,672 | Sauer | Apr. 16, 1946 |

OTHER REFERENCES

Singer et al., Annalen der Chemie, 488 (1931) pages 56-73.

Volnov, "Journal Gen. Chemistry," U. S. S. R. (1940), vol. 10, pages 1600-1604.